United States Patent [19]
Worrell

[11] Patent Number: 6,012,138
[45] Date of Patent: Jan. 4, 2000

[54] DYNAMICALLY VARIABLE LENGTH CPU PIPELINE FOR EFFICIENTLY EXECUTING TWO INSTRUCTION SETS

[75] Inventor: Frank Worrell, San Jose, Calif.

[73] Assignee: LSI Logic Corporation, Milpitas, Calif.

[21] Appl. No.: 08/994,139

[22] Filed: Dec. 19, 1997

[51] Int. Cl.[7] ...................................................... G06F 9/30
[52] U.S. Cl. .............................................. 712/209; 712/43
[58] Field of Search ..................................... 712/209, 210, 712/205, 23, 43, 45; 395/500–547; 707/101

[56] References Cited

U.S. PATENT DOCUMENTS

| | | | |
|---|---|---|---|
| 4,833,640 | 5/1989 | Baba ......................................... | 709/108 |
| 4,991,080 | 2/1991 | Emma et al. ............................. | 712/206 |
| 5,117,488 | 5/1992 | Noguchi et al. ......................... | 712/210 |
| 5,179,680 | 1/1993 | Colwell et al. .......................... | 711/125 |
| 5,377,336 | 12/1994 | Eickemeyer et al. .................... | 712/207 |
| 5,440,701 | 8/1995 | Matsuzaki et al. ...................... | 712/210 |
| 5,442,760 | 8/1995 | Rustad et al. ............................ | 712/215 |
| 5,442,762 | 8/1995 | Kato et al. ............................... | 712/208 |
| 5,463,746 | 10/1995 | Brodnax et al. ......................... | 712/240 |
| 5,465,377 | 11/1995 | Blaner et al. ............................. | 712/23 |
| 5,542,059 | 7/1996 | Blomgren ................................. | 712/41 |
| 5,546,552 | 8/1996 | Coon et al. ............................... | 712/209 |
| 5,574,887 | 11/1996 | Fitch ................................... | 395/500.34 |
| 5,577,259 | 11/1996 | Alferness et al. ........................ | 712/41 |
| 5,632,024 | 5/1997 | Yajima et al. ........................... | 712/205 |
| 5,652,852 | 7/1997 | Yokota ..................................... | 712/208 |
| 5,737,625 | 4/1998 | Jaggar ...................................... | 712/41 |
| 5,781,750 | 7/1998 | Blomgren et al. ....................... | 712/209 |
| 5,867,682 | 2/1999 | Witt et al. ................................ | 712/210 |

FOREIGN PATENT DOCUMENTS

| | | | |
|---|---|---|---|
| 95/30187 | 11/1995 | WIPO ............................. | G06F 9/318 |
| 95/30188 | 11/1995 | WIPO ............................. | G06F 9/318 |

*Primary Examiner*—John A. Follansbee

[57] ABSTRACT

A processor for a data-processing system is provided with a dynamically reconfigurable multistage pipeline which permits the execution of more than one instruction set by the processor utilizing the same instruction decoding circuitry and instruction execution control logic circuitry. In one embodiment, the pipeline includes an instruction fetch stage, an instruction conversion stage, an instruction decode stage, and a multiplexer which is used to switch the instruction conversion stage into and out of the pipeline between the instruction fetch stage and the instruction decode stage, even while instructions continue to be executed by the pipeline. The multiplexer operates under control of the instruction decode stage and may be set in response to decoded instructions. The instruction fetch stage is coupled to a bus to retrieve an instruction at a location specified by a program counter. The instruction conversion stage is coupled to the instruction fetch stage to receive the instruction and is configured to convert the instruction from a non-native instruction set to a corresponding instruction in a native instruction set. The multiplexer is coupled to the instruction fetch stage and to the instruction conversion stage. The multiplexer is configured to forward the converted instruction from the instruction conversion stage if a mode bit is set, and is further configured to forward the instruction from the instruction fetch stage if the mode bit is reset. The instruction decode stage is coupled to the multiplexer to receive a native instruction and is configured to identify instruction operands for the native instruction.

9 Claims, 4 Drawing Sheets

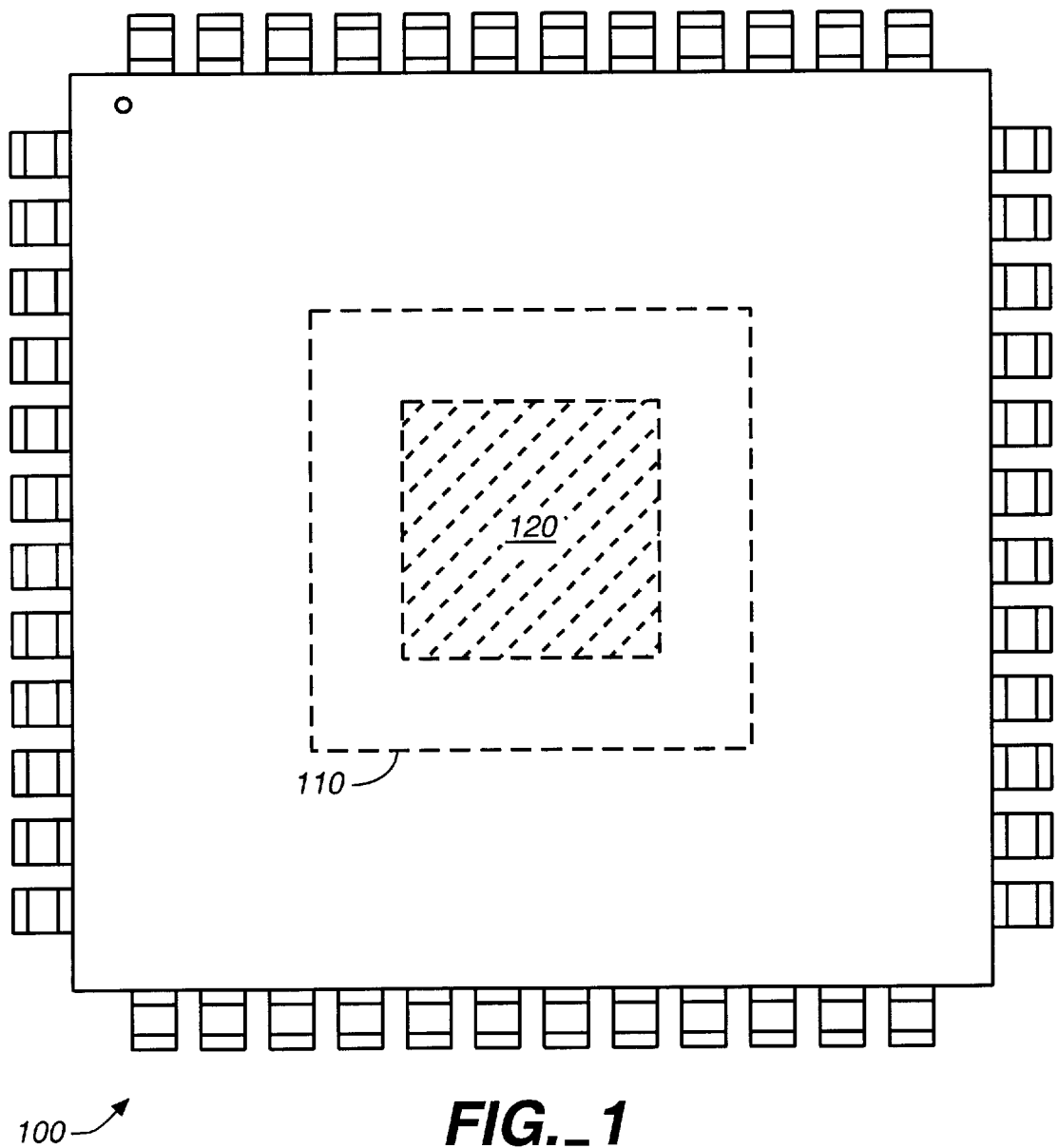
FIG._1

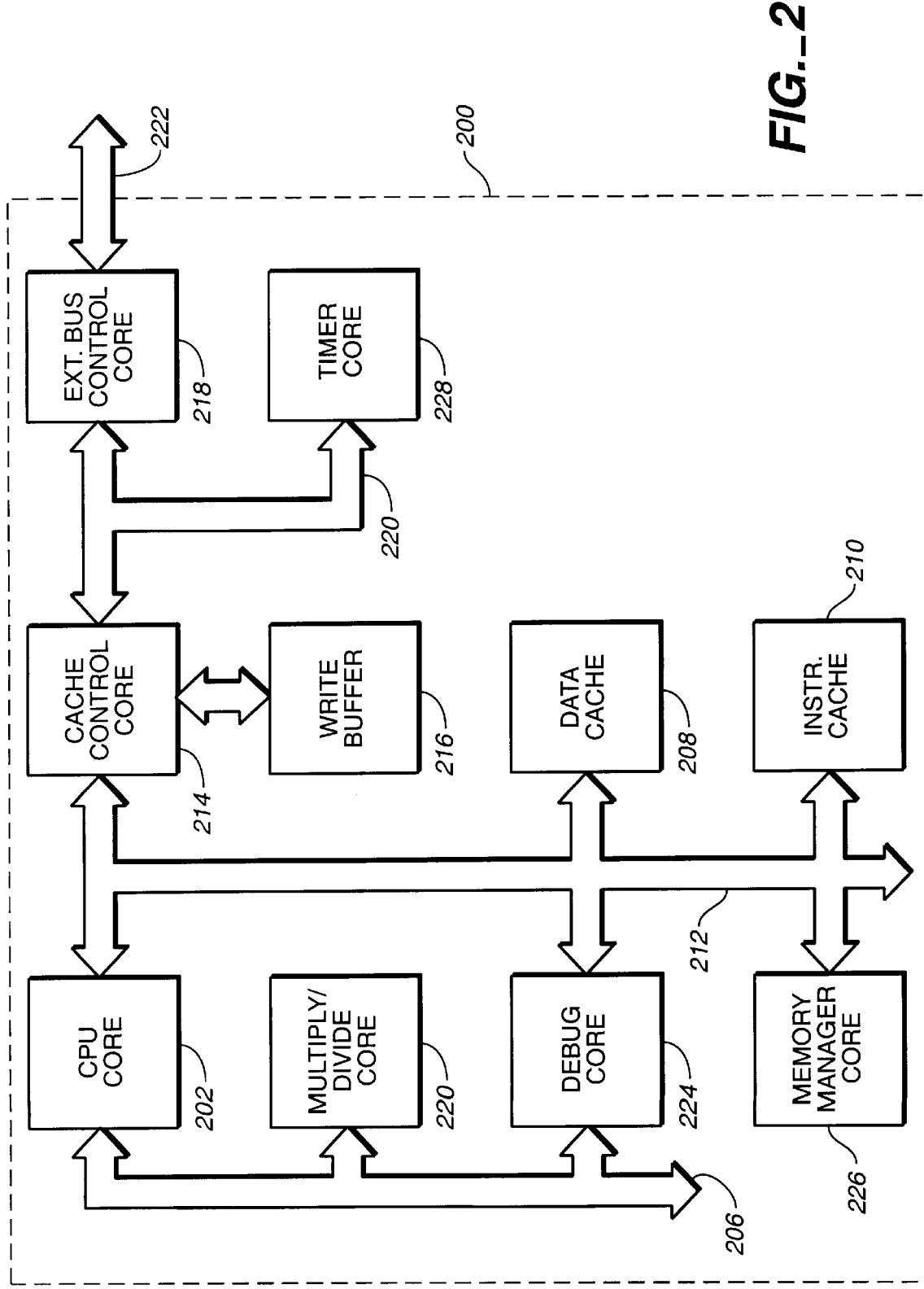
FIG._2

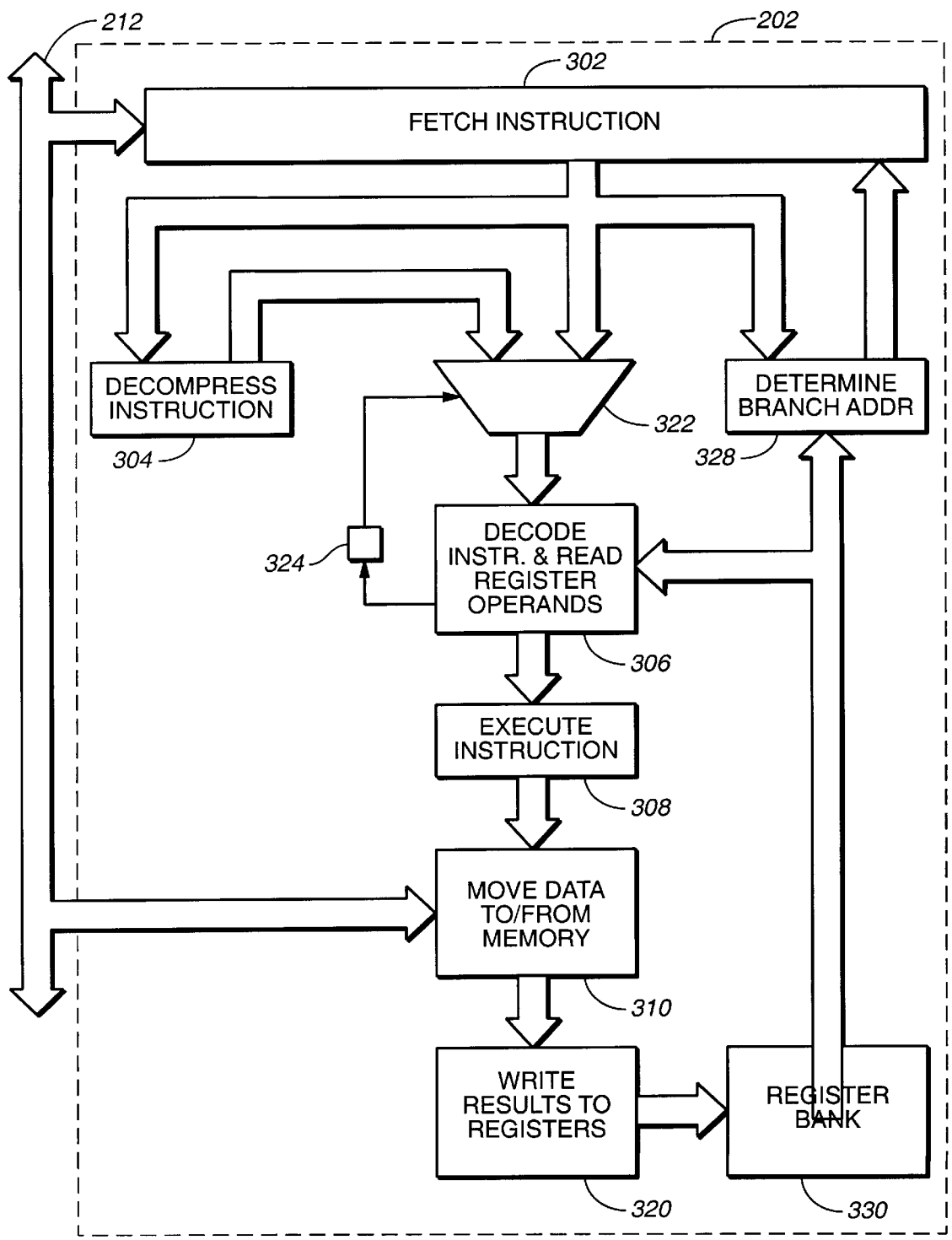
FIG._3

FIG._4

← USING 5 STAGES | USING 6 STAGES →

| | T | T+1 | T+2 | T+3 | T+4 | T+5 | T+6 | T+7 |
|---|---|---|---|---|---|---|---|---|
| FETCH | JUMP | SLOT | TARGET | INSTR8 | INSTR9 | INSTR10 | INSTR11 | INSTR12 |
| DECMPR | — | — | — | TARGET | INSTR8 | INSTR9 | INSTR10 | INSTR11 |
| READ | INSTR4 | JUMP | SLOT | — | TARGET | INSTR8 | INSTR9 | INSTR10 |
| EXEC | INSTR3 | INSTR4 | JUMP | SLOT | — | — | INSTR8 | INSTR9 |
| MOVE | INSTR2 | INSTR3 | INSTR4 | JUMP | SLOT | — | TARGET | INSTR8 |
| WRITE | INSTR1 | INSTR2 | INSTR3 | INSTR4 | JUMP | SLOT | — | TARGET |

FIG._5

← USING 5 STAGES | USING 6 STAGES →

| | T | T+1 | T+2 | T+3 | T+4 | T+5 | T+6 | T+7 |
|---|---|---|---|---|---|---|---|---|
| FETCH | JUMP | SLOT | — | TARGET | INSTR8 | INSTR9 | INSTR10 | INSTR11 |
| DECMPR | INSTR4 | JUMP | SLOT | — | TARGET | INSTR8 | — | — |
| READ | INSTR3 | INSTR4 | JUMP | SLOT | — | TARGET | INSTR9 | INSTR10 |
| EXEC | INSTR2 | INSTR3 | INSTR4 | JUMP | SLOT | — | INSTR8 | INSTR9 |
| MOVE | INSTR1 | INSTR2 | INSTR3 | INSTR4 | JUMP | SLOT | TARGET | INSTR8 |
| WRITE | INSTR0 | INSTR1 | INSTR2 | INSTR3 | INSTR4 | JUMP | SLOT | TARGET |

DYNAMICALLY VARIABLE LENGTH CPU PIPELINE FOR EFFICIENTLY EXECUTING TWO INSTRUCTION SETS

BACKGROUND OF THE INVENTION

1. Field of the Invention

This invention relates to the field of processors for data-processing systems, and in particular to a processor having a variable length pipeline for executing multiple instruction sets.

2. Description of the Related Art

In a data-processing system the basic logical arithmetic computational operations are performed by the processor. For this purpose there is provided within the processor a number of registers and logic circuits. The processor registers are used to receive, hold, and transmit information (data and instructions) used by the processor. Several different types of registers are provided within the typical processor. For example, an accumulator register temporarily stores data and accumulates the results of logical or arithmetic operations. A program counter stores the address of the next instruction in memory to be executed. An instruction register stores the instruction code (also known as the operation code) portion of instruction which is currently being executed by the processor, and an address register or data counter stores the operand portion of the currently executing instruction. Throughout the specification the term "instruction" will hereafter be used to refer specifically to the instruction code or operation code portion of an instruction.

To enable the processor to perform all of the intended arithmetic and logical operations which are desired to be performed, the processor is provided with the capability of executing a repertory of individual instructions collectively known as an instruction set. Individual instructions are executed by the processor to perform such operations as loading information into a register, transferring information between registers or between registers and memory, comparing the contents of two registers, and so forth. Such instructions may be thought of as "macroinstructions" since the execution of one such instruction by the processor comprises a number of sub-operations or "microinstructions" by the circuitry making up the instruction execution control logic portion of the processor. During the execution of a single instruction many different logic gates in the instruction execution control logic circuitry may be opened and closed in a precise sequence in order to implement the particular macro-operation called for by the instruction. The opening or closing of each gate may be individually viewed as a single microinstruction.

The instruction format convergence or compatibility problem is fairly well known. Several general strategies have evolved for dealing with this compatibility problem. One purely software solution involves writing programs in high-level language for compilation specifically for the machine which is to run the program. Thus, programs must be re-compiled into machine language code for each new machine required to run them. A library of tested programs or algorithms can be built up over time and can be migrated to new machines by re-compiling them. This approach necessarily involves the use of a compiler or translator which, of course, must be written for each new machine. This is a substantial effort in most instances, and in the end does not permit incompatible instruction formats to reside in the same machine because the instructions compiled for given machine are compatible with, and are in the format of, that specific machine alone.

It is very useful for a processor to have the capability of executing an instruction set for a different computer in addition to its own instruction set. Normally the processor is endowed with a unique instruction set comprising a plurality of individual operation code words, each of which comprises a distinctive combination of ones and zeros, in response to which the instruction decoding circuitry and instruction execution control circuitry perform all of the individual microinstructions necessary to carry out the particular instruction. A known emulation technique, referred to as microprogramming, allows a processor to execute instruction sets from several different computers. For example, several known computer systems utilized a special program called a "microprogram" to execute a plurality of individual microinstructions which together comprise a basic macroinstruction. In response to a given macroinstruction, a special processor memory known as a control store is accessed and a micro-program corresponding to the macroinstruction is executed, with each of the individual microinstructions, serving to control the desired operation of the instruction execution control logic circuitry. This approach involves the use of advanced assemblers to produce the instruction decode tables that are to be written in the variable decode logic.

While the technique of micro-programming has been utilized in a number of mainframe and minicomputer systems, it does not lend itself well to microcomputer systems, where the space necessary for a control store is difficult to justify on the limited silicon area of a large-scale integrated (LSI) circuit device. There is therefore a need for a mechanism in a processor permitting the processor to execute two or more instruction sets without requiring the expensive consumption of silicon space in an LSI circuit device.

A variant on the micro-programming approach to resolving the compatibility problem involves reservation of a bit or some bit combination in the instruction format for the machine that is to run the program. The extra bit or bit combinations are utilized to flag instructions which are non-native format for the machine. Whenever such a flag combination is encountered, the instruction containing it can be decoded using different rules from the native instruction decode rules. This scheme allows non-native instructions to be located anywhere in the instruction store, but does so at the expense and inconvenience of lengthening the native instruction word by adding the additional bit or bit combinations. This has the effect of using up available instruction decode permutations that might otherwise be used for more beneficial purposes within the machine.

It will be appreciated that the capability of a processor to emulate another processor by executing the instruction set of the other processor adds a great deal of flexibility and versatility to a computer system, which can result ultimately in substantial savings to the user of such system.

SUMMARY OF THE INVENTION

The problems outlined above are in large part solved by a processor for a data-processing system having a dynamically reconfigurable multistage pipeline which permits the execution of more than one instruction set by the processor utilizing the same instruction decoding circuitry and instruction execution control logic circuitry. In one embodiment, the pipeline includes an instruction fetch stage, an instruction conversion stage, an instruction decode stage, and a multiplexer which is used to switch the instruction conversion stage into and out of the pipeline between the instruction fetch stage and the instruction decode stage, even while instructions continue to be executed by the pipeline. The multiplexer operates under control of the instruction decode stage and may be set in response to decoded instructions.

Broadly speaking the present invention contemplates a processor core having a multistage execution pipeline. The processor comprises an instruction fetch stage, an instruction conversion stage, a multiplexer, and an instruction decode stage. The instruction fetch stage is coupled to a bus to retrieve an instruction at a location specified by a program counter. The instruction conversion stage is coupled to the instruction fetch stage to receive the instruction and is configured to convert the instruction from a non-native instruction set to a corresponding instruction in a native instruction set. The multiplexer is coupled to the instruction fetch stage and to the instruction conversion stage. The multiplexer is configured to forward the converted instruction from the instruction conversion stage if a mode bit is set, and is further configured to forward the instruction from the instruction fetch stage if the mode bit is reset. The instruction decode stage is coupled to the multiplexer to receive a native instruction and is configured to identify instruction operands for the native instruction.

The present invention further contemplates a method for executing more than one instruction set using a reconfigurable multistage pipeline. The method comprises: (i) fetching an instruction from memory; (ii) providing the instruction to a conversion stage which is configured to convert any instruction from a first instruction set to a corresponding instruction from a second instruction set; (iii) forwarding the fetched instruction to a decode stage if the fetched instruction belongs to the second instruction set; and (iv) forwarding the corresponding instruction to the decode stage if the fetched instruction belongs to the first instruction set.

BRIEF DESCRIPTION OF THE DRAWINGS

Other objects and advantages of the invention will become apparent upon reading the following detailed description and upon reference to the accompanying drawings in which:

FIG. 1 is a schematic diagram of an application specific integrated chip (ASIC);

FIG. 2 is a functional block diagram of an exemplary custom integrated circuit which includes a processor core;

FIG. 3 is a functional block diagram of a processor core;

FIG. 4 is a table illustrating the progression of instructions through an instruction execution pipeline as the pipeline is switched from a 5-stage configuration to a 6-stage configuration; and FIG. 5 is a table illustrating the progression of instructions through the instruction execution pipeline as the pipeline is switched from a 6-stage configuration to a 5-stage configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a schematic diagram of an application-specific integrated chip (ASIC) 100. ASIC 100 is typically a ceramic package having a cavity 110 in which is placed a silicon chip 120 upon which is fabricated a custom-designed integrated circuit. The pins of ASIC 100 are used to provide external electrical connections to the integrated circuit on chip 120 in a well-known manner. Custom-designed integrated circuits often involve a prohibitive amount of design effort which it is desirable to minimize.

A popular method of reducing design costs is to use a set of pre-designed core modules, or "cores", which implement standard functions and which may be mixed and matched by customers to obtain a custom-designed integrated circuit with the desired functionality. A block diagram of an exemplary custom-designed circuit is shown in FIG. 2. By choosing cores from a set of predefined core modules, a system designer is able to quickly create an ASIC for nearly any desired purpose.

With reference to FIG. 2, should a designer wish to create a programmable multi-axis servo-controller ASIC 200 (for example), he could take a high-speed RISC core 202 and augment it with a multiply/divide core 204 using an extension of an internal CPU bus 206. A data cache 208 and an instruction cache 210 may be coupled to the CPU core 202 via a local CPU bus 212 to provide support for the high-speed RISC core. A cache controller 214 would then also be coupled to local CPU bus 212 and perhaps supported with a write buffer 216. An external bus control core 218 would be used to couple an on-chip system bus 220 with an off-chip system bus 222 for access to external memory chips, sensors, and control line drivers. Additional cores may be incorporated to provide other features. The debug core 224 designed to assist in system debugging may be built into the ASIC 200. Memory management features may be provided with a memory manager core 226, and space permitting, an on-chip timer core 228 may be provided.

Turning now to FIG. 3, a processor core 202 is shown. Processor core 202 advantageously includes a dynamically variable length CPU pipeline for efficiently executing two instruction sets. Pipelining is an implementation technique whereby multiple instructions are simultaneously overlapped in execution. It provides a method for improving the efficiency and execution speed of the CPU. In a pipeline structure, instructions enter at one end—are processed through the stages or pipe segments—and exit at the other end. Each of the stages of the pipeline completes a part of the instruction. In the embodiment of FIG. 3, six stages are provided: a fetch instruction stage 302, a decompress instruction stage 304, a decode instruction stage 306, an execute instruction stage 308, a memory access stage 310, and a write back stage 320. Processor core 202 further includes a multiplexer 322, a mode indicator 324, a branch address calculator 328, and a register bank 330.

The fetch instruction stage 302 includes a program counter which indicates the memory address of the next instruction to be fetched. The fetch instruction stage 302 retrieves the indicated instruction during a first pipeline cycle by accessing the local CPU bus 212. At the beginning of the next pipeline cycle, the instruction is provided to decompress instruction stage 304, multiplexer 322, and branch address calculator 328. The function of decompress instruction stage 304 is to convert from a non-native instruction set to a native instruction set by mapping instructions from the former to corresponding instructions from the latter. When mode indicator 324 indicates that fetched instructions are non-native, multiplexer 322 is set to forward output from decompress instruction stage 304 to decode instruction stage 306. When mode indicator 324 indicates that fetched instructions are native, multiplexer 322 is set to forward output from fetch instruction stage 302 to the decode instruction stage 306.

During the second pipeline cycle, branch address calculator 328 determines if the fetched instruction represents a jump or a potential branch, and if so, it calculates the address of the target instruction. The address specified by the jump or branch instruction is determined by branch address calculator 328 using immediate operands of the instruction, register values, and value of the program counter.

At the beginning of a pipeline cycle, decode instruction stage 306 receives a native instruction from multiplexer 322 and identifies any register operands specified by the native instruction. The indicated register operands values are retrieved from register bank 330, and the native instruction is placed in appropriate control signal form for execute instruction stage 308. In one embodiment, decode instruction stage 306 detects register dependencies on results of instructions which have not yet exited the pipeline, and is configured to stall the initial stages of the pipeline until the needed register values are provided.

During the subsequent pipeline cycle, execute instruction stage 308 carries out arithmetic and/or logical operations necessary to implement the native instruction. The results produced by execute instruction stage 308 are provided to memory access stage 310 at beginning of the next pipeline cycle. If the native operation does not indicate a memory access, memory access stage 310 merely acts as a temporary holding register. Otherwise, memory access stage 310 provides data to or retrieves data from local CPU bus 212. In the following pipeline cycle, write back stage 320 takes the output from memory access stage 310 and uses it to update register bank 330.

Processor core 202 is therefore observed to have a five stage pipeline for executing instructions from a native instruction set. A sixth stage, the decompress instruction stage 304, may be added to the pipeline between the fetch instruction stage 302 and the decode instruction stage 306 by setting mode indicator 324, thereby enabling the pipeline to execute instructions from a non-native instruction set. In the embodiment shown, mode indicator 324 is set by decode instruction stage 306. It is noted that this allows dynamic reconfiguration of the pipeline, i.e. the pipeline is able to switch configurations while instructions are being executed. This is discussed further below.

Turning now to FIG. 4, the operation of the pipeline structure is illustrated. The pipeline stages are denoted by the entries along the left-hand column (FETCH, DECMPR, READ, EXEC, MOVE, and WRITE). The clock time intervals between instruction steps are illustrated by the entries along the top row (T, T+1, T+2, . . .). Each clock time interval in the pipeline is referred to as a pipeline cycle or clock cycle. Note that in accordance with pipeline principles, during the first pipeline cycle shown a first instruction (INSTR1) is having its results written back to the register, a second instruction (INSTR2) is performing a memory access, a third instruction (INSTR3) is executing its arithmetic operations, a fourth instruction (INSTR4) is retrieving values from the register file, and a fifth instruction (JUMP) is being fetched. In the initial pipeline configuration of FIG. 4, the decompress instruction stage is not being used. The JUMP instruction is assumed to be a native jump instruction which also specifies a new setting for the mode indicator 324. In the current embodiment it is assumed that any jump instruction has associated with it a delay slot which holds an instruction which will be executed before the instruction targeted by the jump. For clarity these instructions will hereafter be referred to as the SLOT and TARGET instructions respectively.

In the second pipeline cycle shown, the instructions have each advanced to a subsequent pipeline stage, and the SLOT instruction is being fetched. The branch address calculator 328 is calculating the address of the target instruction, and the decode instruction stage 306 is processing the JUMP instruction. In the third pipeline cycle shown, the instructions have again advanced, the fetch instruction stage 302 is fetching the TARGET instruction, and the decode stage 306 is setting the mode indicator 324. Once the mode indicator 324 is set, subsequent pipeline cycles will use all six pipeline stages. FIG. 4 shows that the TARGET instruction and subsequent instructions are decompressed by the decompress instruction stage 304, i.e. they are converted from the non-native instruction set to the native instruction set.

Turning now to FIG. 5, the operation of the pipeline during a switch from non-native mode to native mode is shown. As before, in the first pipeline cycle shown, the write back, memory access, execute instruction, and decode instruction stages are shown performing their respective functions on instructions INSTR0, INSTR1, INSTR2, and INSTR3. Since the pipeline is operating in non-native mode, the decompress instruction stage is also operating on an instruction INSTR4, while the JUMP instruction is being fetched by the fetch instruction stage. In this case the JUMP instruction is assumed to be a non-native instruction which corresponds to a native JUMP instruction which, as before, also specifies a new setting for the mode indicator 324.

In the second pipeline cycle shown, instructions have each advanced to a subsequent pipeline stage, and the SLOT instruction is being fetched. The branch address calculator 328 is calculating the address of the target instruction, and the decompress instruction stage 304 is converting the JUMP instruction. In the third pipeline cycle shown, the instructions have again advanced, and the fetch instruction stage 302 is fetching the TARGET instruction. This fetch is shown as a bubble (------) because it will be invalidated in a subsequent pipeline cycle. The decompress instruction stage 304 is operating on the SLOT instruction, and the decode instruction stage 306 is processing the JUMP instruction. As the decode instruction stage 306 processes the JUMP instruction, it prepares to send a signal to the fetch instruction stage 302 to indicate that on the subsequent pipeline cycle, the fetch instruction stage 302 should either hold or "re-fetch" the TARGET instruction. Consequently in the fourth pipeline cycle shown, the fetch instruction stage 302 is fetching the TARGET instruction, the decode stage 306 is processing the SLOT instruction, and the decode stage 306, is resetting the mode indicator 324. Once the mode indicator 324 is reset, any instruction held by the decompress stage 304 is invalidated, and subsequent pipeline cycles will not use the decompress stage 304.

Numerous variations and modifications will become apparent to those skilled in the art once the above disclosure is fully appreciated. For example, the instruction execution stage may set the mode bit rather than the instruction decode stage. It is intended that the following claims be interpreted to embrace all such variations and modifications.

What is claimed is:

1. A processor core having a multistage execution pipeline, the multistage execution pipeline having a plurality of configurations, each configuration having a different number of stages than the other configurations, wherein the processor comprises:

an instruction fetch stage coupled to a bus to retrieve an instruction from a first instruction set at a location specified by a program counter;

an instruction conversion stage coupled to the instruction fetch stage to receive the instruction and configured to convert the instruction from a non-native instruction set to a corresponding instruction in a native instruction set;

a multiplexer coupled to the instruction fetch stage and to the instruction conversion stage and configured to forward the converted instruction from the instruction conversion stage if a mode bit is set, wherein the multiplexer is further configured to forward the instruction from the instruction fetch stage if the mode bit is reset;

an instruction decode stage coupled to the multiplexer to receive a native instruction and configured to identify instruction operands for the native instruction such that the multistage execution pipeline switches from a first configuration to a second configuration while instructions are being executed, wherein the change in configurations enables a change from the first instruction set to a second instruction set; wherein the instruction fetch stage, the instruction conversion stage and the instruction decode stage are part of the multistage execution pipeline when the multistage execution pipeline is in the second configuration.

2. The processor core as recited in claim 1, wherein the instruction decode stage is further configured to retrieve instruction operands from a register bank and to provide execution information.

3. The processor core as recited in claim 1, further comprising a branch address determination unit coupled to the instruction fetch stage to receive the instruction, coupled to a register bank to retrieve instruction operands, and configured to determine a target instruction address.

4. The processor core as recited in claim 1, further comprising an instruction execution stage coupled to the instruction decode stage to receive execution information with instruction operands and configured to perform an operation specified by the execution information to produce a result.

5. The processor core as recited in claim 4, wherein the mode bit is established by the instruction decode stage in response to an instruction from the native instruction set.

6. The processor core as recited in claim 4, further comprising a memory access stage coupled to the instruction execution stage to receive the result and configured to determine if the result represents an address for a memory access, wherein the memory access stage writes a data value to memory if the result represents an address for a memory store, and wherein the memory access stage retrieves a value from memory if the result represents an address for a memory load.

7. The processor core as recited in claim 6, further comprising a write back stage coupled to receive output from the memory access stage and configured to responsively update a register bank.

8. The processor core as recited in claim 1, wherein the instruction conversion stage comprises a decompress stage.

9. A method for executing at least two instructions sets using a reconfigurable multi-stage pipeline, the multistage execution pipeline having a plurality of configurations, each configuration having a different number of stages than the other configurations, wherein the method comprises:

fetching an instruction from a first instruction set from memory;

providing the instruction to a conversion stage which is configured to convert any instruction from a first instruction set to a corresponding instruction of a second instruction set;

forwarding the fetched instruction to a decode stage if the fetched instruction belongs to the second instruction set;

forwarding, from the conversion stage, the corresponding instruction to the decode stage if the fetched instruction belongs to the first instruction set;

while instructions are being executed, switching configurations of the multistage execution pipeline;

after the step of switching configurations, executing an instruction from a second instruction set; wherein the instruction fetch stage, instruction conversion stage and instruction decode stage are part of the multistage execution pipeline after the step of switching configurations of the multistage execution pipeline.

\* \* \* \* \*